C. P. HIGGINS.
PIPE COUPLING.
APPLICATION FILED AUG. 2, 1906.

977,740.

Patented Dec. 6, 1910.
3 SHEETS—SHEET 1.

WITNESSES:
Catherine Taggart
A. Parker Nevin

INVENTOR
Campbell P. Higgins
BY
Chas. W. Forbes
ATTORNEY

C. P. HIGGINS.
PIPE COUPLING.
APPLICATION FILED AUG. 2, 1906.

977,740.

Patented Dec. 6, 1910.

3 SHEETS—SHEET 3.

UNITED STATES PATENT OFFICE.

CAMPBELL P. HIGGINS, OF ROSELLE, NEW JERSEY, ASSIGNOR TO THE BABCOCK & WILCOX COMPANY, OF BAYONNE, NEW JERSEY, A CORPORATION OF NEW JERSEY.

PIPE-COUPLING.

977,740.

Specification of Letters Patent.

Patented Dec. 6, 1910.

Application filed August 2, 1906. Serial No. 328,837.

*To all whom it may concern:*

Be it known that I, CAMPBELL P. HIGGINS, a citizen of the United States, residing at Roselle, in the county of Union and State of New Jersey, have invented certain new and useful Improvements in Pipe-Couplings, of which the following is a specification, reference being had therein to the accompanying drawing.

This invention relates to a seamless branched pipe coupling made integral of wrought metal and the invention consists in a seamless blank comprising a spherical body portion and a projecting neck from which body portion one or more branches or necks may be projected at any desired angle.

The invention also consists in the process of making the same as hereinafter described and claimed.

In the following description of the process of forming the blank and completing the coupling, reference is made to the accompanying drawings showing the product of the successive steps of the process of forming the blank and the succeeding operations in producing therefrom various patterns of a complete coupling, the respective views, Figs. 1 to 12, being referred to incidental with the related descriptive matter as follows:—

Figure 1:
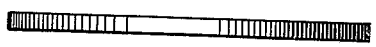
Figure 2:
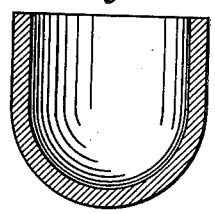
Figure 3:
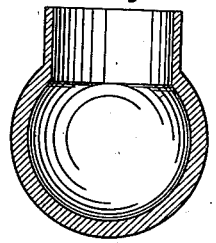

A disk of metal (Fig. 1) is formed into cup shape, with its closed end of hemispherical form, as shown in Fig. 2. The open end is then contracted and drawn out for one pipe connection leaving the body or shell of the blank in spherical form, as shown in Fig. 3. These operations complete the process of forming the blank. From this blank a coupling may be completed with other branch pipe connections projecting from the spherical portion of the blank at any desired angle.

Figure 4:
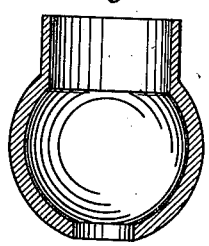
Figure 5:
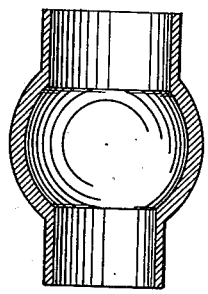
Figure 6:
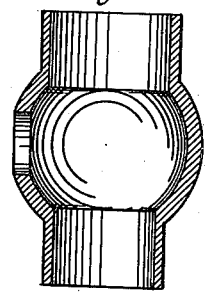
Figure 7:
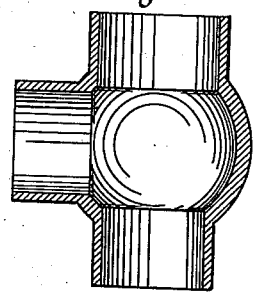
Figure 8:
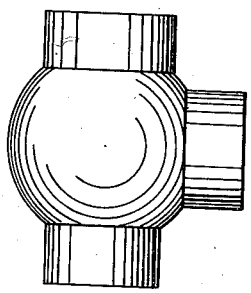

In forming the additional pipe connections integral with the spherical portion of the blank, such operation is effected by making a perforation through the body or shell at any desired point, a point opposite the neck on the blank being shown, for example, in Fig. 4. A plug or plunger hereinafter referred to may then be passed within the shell and forced through the perforation, forming a surrounding flange and drawing out an additional neck, as shown, for example, in Fig. 5. A perforation may also be made through the shell at a right angle with the necks already formed, as shown in Fig. 6, and the plug or plunger forced therethrough to form a branch or additional neck, as shown in Fig. 7, the coupling at this stage of its manufacture being in the form of a "tee".

In the product shown in Fig. 3 perforations may be made for forming necks diverging from the shell at any desired angle to produce the various forms of couplings, such as "tees", "Y's", "elbows", etc., as shown, for example, in Figs. 8, 9, 10 and 11.

Figure 12:
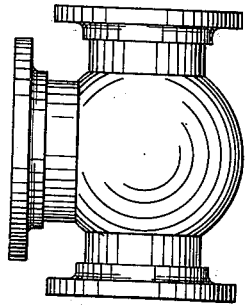

It will be readily understood that the necks are intended for a pipe or other connection and may be threaded for a pipe attachment or a flange, for illustration, as shown in Fig. 12.

The means that may be employed for producing the blank are obvious to metal workers, the circular blank, Fig. 1, being subjected to a die block and plunger and formed into the elongated cup shape shown in Fig. 2. This cup-shaped blank is then placed upon a former and the open end contracted and drawn out by compression dies to produce the blank form shown in Fig. 3, which consists in a spherical body part with a projecting neck. In completing a coupling the spherical body of the blank is perforated at any point where it is desired that a branched neck be formed either as shown in Figs. 4 or 6, or at other desired angles, as shown, for example, in Fig. 10.

Figure 9:
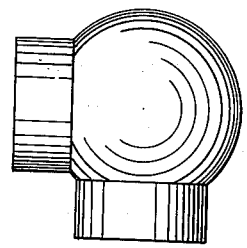
Figure 10:
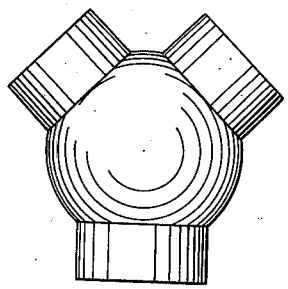
Figure 11:
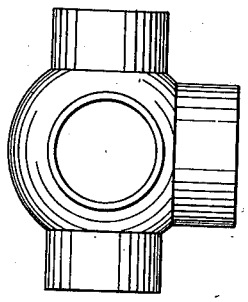
Figure 15:
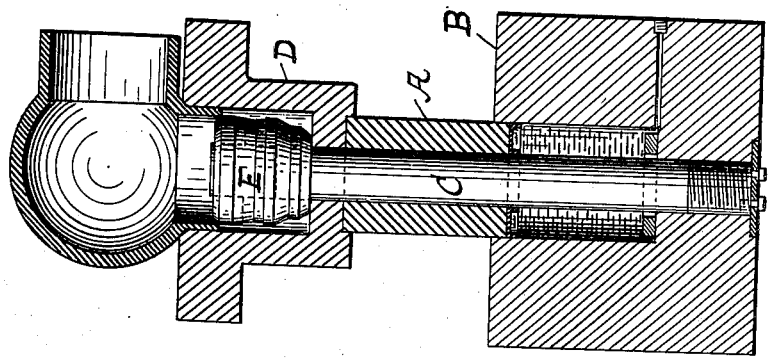
Figure 14:
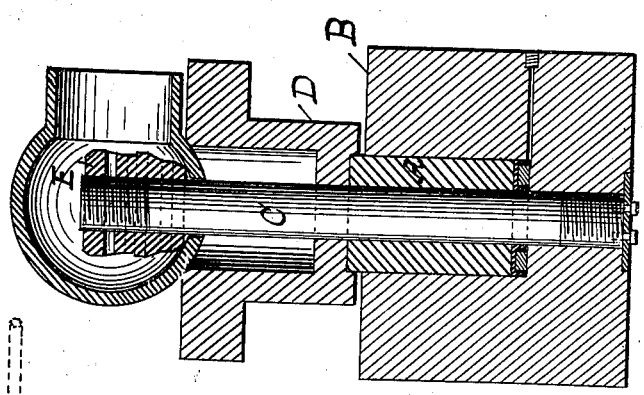
Figure 13:
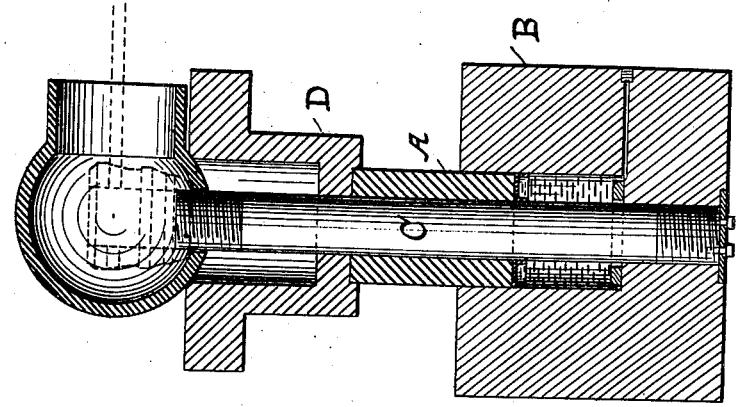

The special devices employed in forming or drawing out a neck integral with the spherical body at an angle to the longitudinal axis of the coupling as shown at Figs. 7, 9 or 10, are illustrated in Figs. 13, 14 and 15 in the accompanying drawings and comprise an hydraulic ram A operating in the cylinder B and carrying a supporting former D. A guiding stationary bolt or plunger C is secured to the cylinder B and provided with a removable head or plug E. As shown in Fig. 13 the perforated heated blank from which the neck is to be formed is placed over the end of the bolt C and the head or plug E (shown in dotted lines) is introduced through the neck of the spherical blank. The water is then exhausted from cylinder B and the plug and heated blank are rotated and which brings the parts to the position shown in Fig. 14. As shown in Fig. 14 pressure is then applied to cylinder B which elevates the ram A and die D and drawing the head or plug E through and forming the additional neck. The devices herein described for forming the necks integral with the spherical body of the coupling at any desired angle, are embodied in a machine for which Letters Patent were granted to me April 4th, 1896, No. 558,072, and are not, therefore, herein claimed.

I am aware that a wrought metal pipe coupling having an open body portion of cylindrical form and one or more branches or projecting necks formed integral and at a right angle to the longitudinal axis of the coupling, is not new, but I am not aware that a seamless blank has heretofore been made of wrought metal having a body portion of spherical form with an integral projecting neck and from such spherical body portion one or more branches or projecting necks may be formed at any desired angle from the longitudinal axis of the blank; therefore,

What I claim and desire to secure by Letters-Patent is:—

1. The herein described article comprising a seamless spherical shell of wrought metal having an integral neck projecting therefrom and from which other necks may be drawn at varying angles and of varying diameters.

2. The herein described article comprising a seamless spherical shell of wrought metal having an integral projecting neck, and one or more pipe connections drawn from said shell at any desired angle.

3. The herein described process of making a seamless blank of wrought metal for the manufacture of pipe couplings which consists in forming a circular blank into a hemispherical cup shape, and then contracting the open end to form a spherical body portion and a projecting neck integral therewith.

4. The herein described process of making pipe couplings which consists in forming a circular blank into a hemispherical cup shape, and then contracting the open end to form a spherical body portion and a projecting neck integral therewith, and then forcing or drawing out additional necks at any desired angle integral with said body portion.

In testimony whereof I affix my signature in presence of two witnesses.

CAMPBELL P. HIGGINS.

Witnesses:
H. S. CHINNOCK, Jr.,
H. E. VOORHIS.